US010657397B2

(12) United States Patent
Ryu et al.

(10) Patent No.: US 10,657,397 B2
(45) Date of Patent: May 19, 2020

(54) APPARATUS FOR DETERMINING CONCENTRATION OF DRIVER, SYSTEM HAVING THE SAME, AND METHOD THEREOF

(71) Applicant: HYUNDAI MOTOR COMPANY, Seoul (KR)

(72) Inventors: Seong Sook Ryu, Seoul (KR); Jin Kwon Kim, Suwon-si (KR); Byoung Joon Lee, Suwon-si (KR); Sam Yong Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 384 days.

(21) Appl. No.: 15/581,070

(22) Filed: Apr. 28, 2017

(65) Prior Publication Data

US 2018/0129891 A1 May 10, 2018

(30) Foreign Application Priority Data

Nov. 8, 2016 (KR) .......................... 10-2016-0148016

(51) Int. Cl.
*G06K 9/62* (2006.01)
*G06K 9/00* (2006.01)
(Continued)

(52) U.S. Cl.
CPC ........ *G06K 9/00845* (2013.01); *B60K 28/066* (2013.01); *B60W 40/04* (2013.01);
(Continued)

(58) Field of Classification Search
CPC ........... G06K 9/00597; G06K 9/00604; G06K 9/0061; G06K 9/00617; G06K 9/00624;
(Continued)

(56) References Cited

U.S. PATENT DOCUMENTS 6,033,072 A * 3/2000 Ono ....................... G06F 3/013
351/208
6,661,345 B1 12/2003 Bevan et al.
(Continued)

FOREIGN PATENT DOCUMENTS

JP H08-178712 A 7/1996
JP 2004-070795 A 3/2004
(Continued)

OTHER PUBLICATIONS

Korean Office Action issued in Application No. 10-2016-0148016 dated Feb. 1, 2018.
(Continued)

*Primary Examiner* — Eric Rush
(74) *Attorney, Agent, or Firm* — Morgan, Lewis & Bockius LLP

(57) ABSTRACT

An apparatus for determining a concentration of a driver includes: a region-of-interest definition processor configured to define a region-of-interest based on traffic-related information on front image information of a vehicle running; a driver eye-gaze detection processor configured to detect a plurality of eye-gaze points from driver image information of a driver in accordance with an eye-gaze movement of the driver; a driver concentration information calculation processor configured to calculate concentration information of each of the eye-gaze points; an image coordinate system processor configured to convert the region-of-interest to an image coordinate system and convert positions of the eye-gaze points to the image coordinate system; and a concentration determination processor configured to determine a concentration of the driver on the image coordinate system based on the concentration information.

17 Claims, 13 Drawing Sheets

(51) Int. Cl.
*B60W 40/04* (2006.01)
*B60W 40/08* (2012.01)
*G08G 1/01* (2006.01)
*G08G 1/16* (2006.01)
*B60K 28/06* (2006.01)
*G06K 9/46* (2006.01)

(52) U.S. Cl.
CPC ......... *B60W 40/08* (2013.01); *G06K 9/00597* (2013.01); *G06K 9/00617* (2013.01); *G06K 9/00791* (2013.01); *G06K 9/00832* (2013.01); *G06K 9/4671* (2013.01); *G08G 1/0112* (2013.01); *G08G 1/167* (2013.01); *B60W 2420/42* (2013.01); *B60Y 2302/03* (2013.01); *B60Y 2400/90* (2013.01); *G06K 2009/4666* (2013.01); *G06T 2207/30248* (2013.01); *G06T 2207/30252* (2013.01); *G06T 2207/30268* (2013.01)

(58) Field of Classification Search
CPC ........... G06K 9/00664; G06K 9/00671; G06K 9/00785; G06K 9/00791; G06K 9/00798; G06K 9/00805; G06K 9/00825; G06K 9/00832; G06K 9/00845; G06K 9/4671; G06K 2009/4666; G06K 2209/21; G06T 2207/30248; G06T 2207/30252; G06T 2207/30256; G06T 2207/30261; G06T 2207/30268; G08G 1/0104; G08G 1/0112; G08G 1/04; G08G 1/167; B60K 28/02; B60K 28/06; B60K 28/066; B60W 40/04; B60W 40/06; B60W 40/08; B60W 50/08; B60W 50/14; B60W 50/143; B60W 50/146; B60W 50/16; B60W 2040/0818; B60W 2040/0827; B60W 2040/0863; B60W 2420/42; B60Y 2302/00; B60Y 2302/03; B60Y 2302/05; B60Y 2302/07; B60Y 2302/09; B60Y 2400/90; B60Y 2400/902; A61B 3/113
USPC ....... 382/100, 103, 104, 106, 107, 117, 154, 382/224, 291, 293, 294; 340/435, 436, 340/576, 933, 937, 988; 348/77, 78, 148, 348/149; 351/209, 210; 701/1; 180/272
See application file for complete search history.

(56) References Cited

U.S. PATENT DOCUMENTS

| | | | | |
|---|---|---|---|---|
| 7,460,940 B2* | 12/2008 | Larsson | ............. | G06K 9/00832 701/49 |
| 7,705,738 B2 | 4/2010 | Fukaya et al. | | |
| 7,815,313 B2* | 10/2010 | Ito | .......... | G08G 1/167 340/425.5 |
| 8,717,292 B2* | 5/2014 | Niikawa | ................ | G06F 3/013 345/158 |
| 9,340,213 B2 | 5/2016 | Kollegger et al. | | |
| 9,355,546 B2 | 5/2016 | Kim et al. | | |
| 9,405,982 B2 | 8/2016 | Zhang et al. | | |
| 9,586,591 B1* | 3/2017 | Fields | .................... | B60K 35/00 |
| 9,619,722 B2* | 4/2017 | Takeda | ............... | G06K 9/00845 |
| 9,809,167 B1* | 11/2017 | Badger, II | ............. | B60W 50/16 |
| 10,117,577 B2* | 11/2018 | Mochizuki | ......... | G06K 9/00604 |
| 2004/0239509 A1* | 12/2004 | Kisacanin | ............... | G08B 21/06 340/575 |
| 2005/0209749 A1 | 9/2005 | Ito et al. | | |
| 2006/0255956 A1* | 11/2006 | Arakawa | ............... | B60K 28/066 340/576 |
| 2008/0150734 A1* | 6/2008 | Johns | ................. | G06K 9/00845 340/575 |
| 2008/0236929 A1 | 10/2008 | Fukaya et al. | | |
| 2009/0022368 A1* | 1/2009 | Matsuoka | .......... | G06K 9/00805 382/103 |
| 2009/0128311 A1* | 5/2009 | Nishimura | ......... | G06K 9/00845 382/103 |
| 2009/0262973 A1* | 10/2009 | Koshizen | ........... | G06K 9/00604 382/100 |
| 2010/0033333 A1* | 2/2010 | Victor | ................ | G06K 9/00604 382/100 |
| 2011/0169625 A1* | 7/2011 | James | ................. | G06K 9/00845 340/439 |
| 2013/0058529 A1* | 3/2013 | Levin | ................. | G06K 9/00604 382/103 |
| 2014/0078282 A1* | 3/2014 | Aoki | ................. | G06K 9/00845 348/78 |
| 2014/0218188 A1 | 8/2014 | Kim et al. | | |
| 2014/0244096 A1 | 8/2014 | An et al. | | |
| 2014/0272810 A1* | 9/2014 | Fields | ................... | B60W 40/09 434/65 |
| 2015/0109429 A1* | 4/2015 | Inoue | ................. | G06K 9/00845 348/78 |
| 2015/0193664 A1* | 7/2015 | Marti | ................. | G06K 9/00845 382/103 |
| 2016/0272215 A1* | 9/2016 | Laine | ................. | G06K 9/00805 |
| 2018/0086339 A1* | 3/2018 | Hanna | ................ | G06K 9/00845 |

FOREIGN PATENT DOCUMENTS

| | | |
|---|---|---|
| JP | 2005-267108 A | 9/2005 |
| JP | 2008-250775 A | 10/2008 |
| JP | 2014-191474 A | 10/2014 |
| KR | 10-2014-0100629 A | 8/2014 |
| KR | 10-2014-0106939 A | 9/2014 |

OTHER PUBLICATIONS

Korean Notice of Allowance issued in Application No. 10-2016-0148016 dated Jul. 5, 2018.

* cited by examiner

APPARATUS FOR DETERMINING CONCENTRATION OF DRIVER, SYSTEM HAVING THE SAME, AND METHOD THEREOF

CROSS-REFERENCE TO RELATED APPLICATION

This application is based on and claims the benefit of priority to Korean Patent Application No. 10-2016-0148016, filed on Nov. 8, 2016, in the Korean Intellectual Property Office, the disclosure of which is incorporated herein in its entirety by reference.

TECHNICAL FIELD

The present disclosure relates to an apparatus for determining a concentration of a driver, a system having the same, and a method thereof, and more particularly, to a technique capable of determining a driver's current concentration based on driver's concentration information, e.g., an eye-gaze point position, an eye-gaze movement speed, etc., and warning a driver based on the determined result to lead the driver to drive safely.

BACKGROUND

There are various factors contributing to car accidents, such as, reckless driving, occurrence of sudden dangerous situation on the roads, etc., and the proportion of the leading causes of the traffic accidents including speeding while driving, falling asleep in the wheel, and reckless driving is increasing every year.

Drowsiness alert system and speed alert system are existing technologies that periodically warn drivers when they have exceeded the speed limit or when they close their eyes by checking the speed of the vehicle or the eye closure state of the driver. However, the alert system concerning an inattentional blindness state while driving, such as, using the mobile phone, driving in an absent-minded state, etc., is insufficient.

That is, the driver is required to continually check the information that are changed in real-time while driving, e.g., front-running vehicles, signs, lanes, etc., however, the driver has a difficulty of properly handling the information when the driver is intentionally careless or when extensive cognitive loads are imposed.

However, in a conventional alert system, the state of the driver is determined by simply detecting the eye closure or blinking of the driver, thereby causing errors in determining the concentration of the driver.

SUMMARY

The present disclosure has been made to solve the above-mentioned problems occurring in the prior art while advantages achieved by the prior art are maintained intact.

An aspect of the present disclosure provides an apparatus for determining a concentration of a driver, a system having the same, and a method thereof, which are capable of determining a driver's current concentration based on driver's concentration information, e.g., an eye-gaze point position, an eye-gaze movement speed, etc., and warning a driver based on the determined result to lead the driver to drive safely.

The technical problems to be solved by the present inventive concept are not limited to the aforementioned problems, and any other technical problems not mentioned herein will be clearly understood from the following description by those skilled in the art to which the present disclosure pertains.

According to an exemplary embodiment of the present disclosure, an apparatus for determining a concentration of a driver, includes a region-of-interest definition processor configured to define a region-of-interest based on traffic-related information on front image information of a vehicle running, a driver eye-gaze detection processor configured to detect a plurality of eye-gaze points from driver image information of a driver in accordance with an eye-gaze movement of the driver, a driver concentration information calculation processor configured to calculate concentration information of each of the eye-gaze points, an image coordinate system processor configured to convert the region-of-interest to an image coordinate system and convert positions of the eye-gaze points to the image coordinate system, and a concentration determination processor configured to determine a concentration of the driver on the image coordinate system based on the concentration information.

The apparatus further includes a driver attention-guide control processor configured to provide at least one of a warning alarm, a guidance, and an attention-guide to the driver in a case that the concentration of the driver is smaller than a reference value.

The driver attention-guide control processor is configured to control a transfer ratio of a driving control right, in which the driving control right is transferred to the driver, and a transfer time point of the driving control right in a case that the concentration of the driver is smaller than the reference value and the vehicle is driven by a control support device.

The region-of-interest definition processor is configured to define the region-of-interest by adjusting a priority of information that the driver needs to check in accordance with a driving situation occurring in real time while driving.

The driving situation occurring in real time while driving includes at least one of a variation in speed of a front-running vehicle in a driving lane, an interruption of a vehicle running in adjacent lane, a variation of safety distance in a direction B of the vehicle, and a change of the driving lane.

The driver concentration information calculation processor is configured to calculate the positions of the eye-gaze points and an eye-gaze movement speed between the eye-gaze points as the concentration information.

The concentration determination processor is configured to calculate an average value of the eye-gaze movement speed, a dispersion value of the positions of the eye-gaze points, and an area value of the eye-gaze points from the concentration information of the eye-gaze points.

The concentration determination processor is configured to decide a line connected between a first eye-gaze point and a last eye-gaze point in a monitoring processor pattern among the eye-gaze points as a reference line and calculates the dispersion value of the positions of the eye-gaze points using distances between the reference line and the eye-gaze points.

The concentration determination processor is configured to calculate an area of a shape, which is defined by connecting the eye-gaze points to each other using a line, as the area value of the eye-gaze points.

The concentration determination processor is configured to calculate a relative distance between the region-of-interest and the eye-gaze points and determine a correlation degree between the region-of-interest and the eye-gaze points.

The concentration determination processor is configured to differentially quantify the concentration of the driver in accordance with the correlation degree between the region-of-interest and the eye-gaze points.

The concentration determination processor is configured to determine that the concentration of the driver is high or the driver gazes a point other than the region-of-interest in a case that the area value of the eye-gaze points is smaller than a first reference value, the average value of the eye-gaze movement speed is smaller than a second reference value, or the dispersion value of the positions of the eye-gaze points is smaller than a third reference value.

According to another exemplary embodiment of the present disclosure, a system for determining a concentration of a driver, includes an image acquisition device configured to acquire a vehicle front image and a driver facial image, a driver concentration determination processor configured to detect an eye-gaze movement of the driver from the driver facial image, calculate concentration information with respect to each eye-gaze point of the driver, and determine the concentration of the driver based on the concentration information, and an output configured to output a concentration guide warning alarm to the driver in a case that the concentration of the driver is determined to be smaller than a reference value by the driver concentration determination processor.

The output includes a display configured to display at least one of a warning message, a warning light, and a warning screen of an augmented reality screen, a speaker configured to output a warning sound, and a vibrator configured to provide the driver with a vibration stimulus.

The driver concentration determination processor includes a region-of-interest definition processor configured to define a region-of-interest based on traffic-related information on front image information of a vehicle running, a driver eye-gaze detection processor configured to detect a plurality of eye-gaze points from driver image information of a driver in accordance with an eye-gaze movement of the driver, a driver concentration information calculation processor configured to calculate concentration information of each of the eye-gaze points, an image coordinate system processor configured to convert the region-of-interest to an image coordinate system and convert positions of the eye-gaze points to the image coordinate system, and a concentration determination processor configured to determine a concentration of the driver on the image coordinate system based on the concentration information.

The driver concentration information calculation processor is configured to calculate positions of the eye-gaze points and an eye-gaze movement speed between the eye-gaze points as the concentration information.

The concentration determination processor is configured to calculate an average value of the eye-gaze movement speed, a dispersion value of the positions of the eye-gaze points, and an area value of the eye-gaze points from the concentration information of the eye-gaze points.

According to another aspect of the present disclosure, a method for determining a concentration of a driver, includes defining a region-of-interest based on traffic-related information on front image information of a vehicle running, detecting a plurality of eye-gaze points from driver image information of a driver in accordance with an eye-gaze movement of the driver, calculating concentration information of each of the eye-gaze points, converting the region-of-interest to an image coordinate system and converting positions of the eye-gaze points to the image coordinate system, and determining a concentration of the driver on the image coordinate system based on the concentration information.

The calculating the concentration of the driver is performed by calculating the positions of the eye-gaze points and an eye-gaze movement speed between the eye-gaze points as the concentration information.

The determining the concentration of the driver is performed by calculating an average value of the eye-gaze movement speed, a dispersion value of the positions of the eye-gaze points, and an area value of the eye-gaze points from the concentration information of each of the eye-gaze points and comparing each of the average value of the eye-gaze movement speed, the dispersion value of the positions of the eye-gaze points, and the area value of the eye-gaze points with a predetermined corresponding reference value to determine the concentration of the driver.

According to the above, the current concentration of the driver is determined based on the concentration information (e.g., the eye-gaze point position, the eye-gaze movement speed, etc.) to lead the driver to drive safely.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
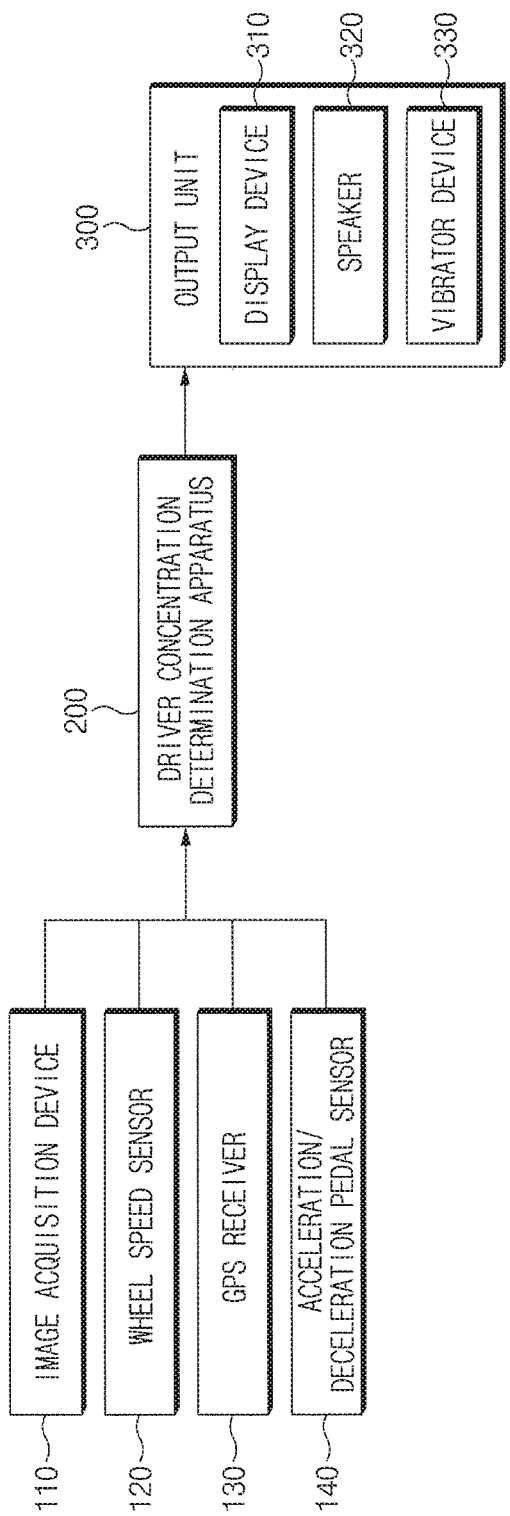
FIG. 1 is a block diagram illustrating a system for determining a concentration of a driver according to an exemplary embodiment of the present disclosure.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, exemplary embodiments of the present disclosure will be described in detail with reference to FIGS. 1 to 12.

FIG. 1 is a block diagram illustrating a system for determining a concentration of a driver according to an exemplary embodiment of the present disclosure.

The system for determining the concentration of the driver according to an exemplary embodiment of the present disclosure includes an image acquisition device 110, a wheel speed sensor 120, a Global Positioning System (GPS) receiver 130, an acceleration/deceleration pedal sensor (accelerator pedal sensor) 140, a driver concentration determination apparatus 200, and an output 300.

The image acquisition device 110 includes a vehicle front camera and a driver camera and acquires vehicle front image information and driver facial image information to provide the vehicle front image information and the driver facial image information to the driver concentration determination apparatus 200. In addition, the vehicle front image information may be acquired by using a camera installed in a lane departure warning system (LDWS) without installing a separate camera for the vehicle front image information. Further, the driver concentration determination apparatus 200 may extract traffic-related information, such as a driving lane, a front-running vehicle, an adjacent-running vehicle, traffic signs, a traffic signal, etc., from the vehicle front image information.

The wheel speed sensor 120 provides vehicle speed information of the vehicle to the driver concentration determination apparatus 200.

The GPS receiver 130 receives GPS information from GPS and provides the GPS information to the driver concentration determination apparatus 200. In this case, the GPS receiver 130 may provide additional information, e.g., a traffic signal, a speed limit, etc., to the driver concentration determination apparatus 200 in conjunction with an apparatus providing map information, and the map providing apparatus may be implemented by a navigation device.

The acceleration/deceleration pedal sensor 140 senses a position of a pedal for the acceleration and deceleration of the vehicle and provides the sensed result to the driver concentration determination apparatus 200.

The driver concentration determination apparatus 200 detects an eye-gaze movement of the driver from the driver facial image and calculates concentration information (i.e., a position of an eye-gaze point, an eye-gaze movement speed) with respect to each eye-gaze point of the driver to determine the concentration of the driver based on the concentration information. Here, the concentration information means the position of the eye-gaze point and the eye-gaze movement speed between the eye-gaze points.

The output 300 outputs a driver's concentration determination result from the driver concentration determination apparatus 200. To this end, the output 300 includes a display 310, a speaker 320, and a vibrator 330.

The display 310 may display at least one of a warning message, a warning light, and a warning screen of an augmented reality screen through a liquid crystal display (LCD), a head up display (HUD), or an augmented reality device. In this case, the warning light may be displayed on the screen in a bar graph form indicating a good or poor level of the driver's concentration.

The speaker 320 may output a warning sound, and the vibrator 330 may be installed in a steering handle, an acceleration pedal, or a driver seat to provide the driver with the vibration stimulus.

Figure 2:
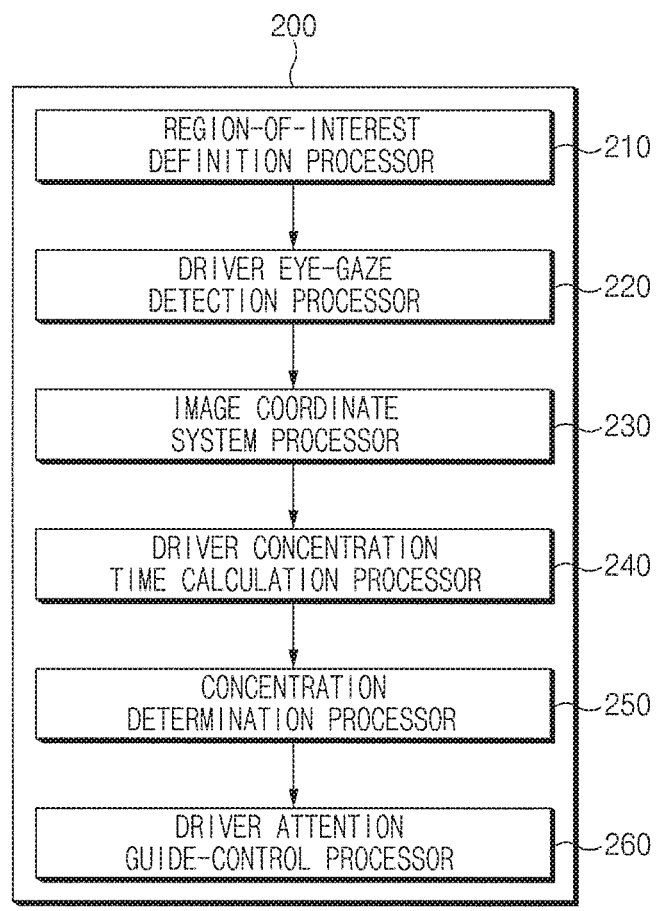
FIG. 2 is a block diagram illustrating an apparatus for determining a concentration of a driver according to exemplary embodiment of the present disclosure.

Hereinafter, the configuration and function of the driver concentration determination apparatus 200 will be described in detail with reference to FIG. 2.

The driver concentration determination apparatus 200 includes a region-of-interest definition processor 210, a driver eye-gaze detection processor 220, an image coordinate system processor 230, a driver concentration information calculation processor 240, a concentration determination processor 250, and a driver attention-guide control processor 260.

Figure 4A:
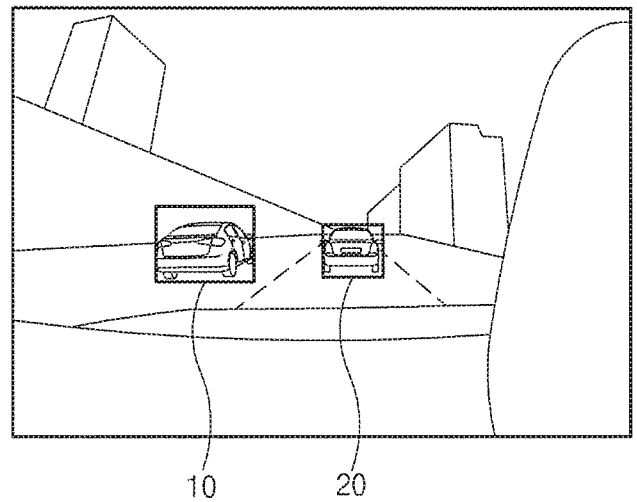
FIG. 4A is a view illustrating a region-of-interest represented in image information according to exemplary embodiment of the present disclosure.

The region-of-interest definition processor 210 defines the region-of-interest in the vehicle front image information based on the traffic-related information while the vehicle runs. That is, the region-of-interest definition processor 210 defines the region-of-interest by adjusting a priority of information that the driver needs to check in accordance with a driving situation occurring in real time while the vehicle runs. In this case, the driving situation may include at least one of a variation in speed of the front-running vehicle in the driving lane, an interruption (i.e., cutting in line) of the vehicle running in adjacent lane, a variation of safety distance in a driving direction of the vehicle, and a change of the driving lane. FIG. 4A shows an example in which regions-of-interest 10 and 20 are defined in the vehicle front image information acquired from the image acquisition device 110. In the exemplary embodiment shown in FIG. 4A, the regions-of-interest correspond to the front-running vehicle.

Figure 3:
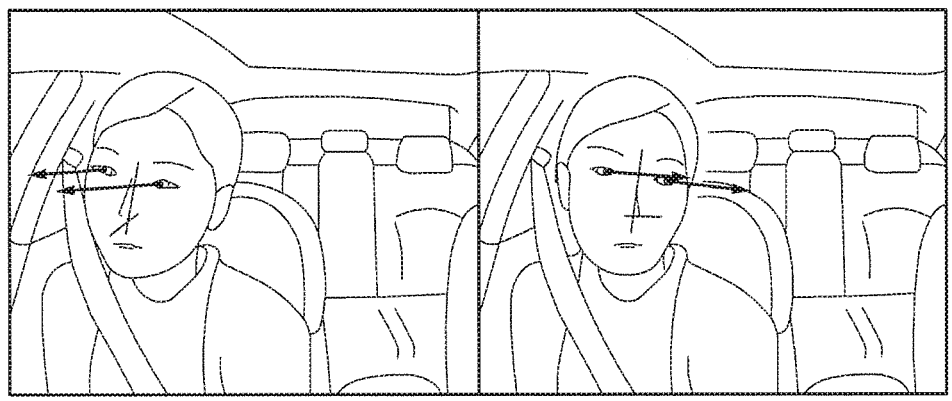
FIG. 3 is a view explaining an eye-gaze movement of a driver according to exemplary embodiment of the present disclosure.

The driver eye-gaze detection processor 220 detects a plurality of eye-gaze points from driver image information of the driver in accordance with the eye-gaze movement of the driver. FIG. 3 is a view explaining the eye-gaze movement of the driver to show the movement of the eye-gaze of the driver.

Figure 4B:
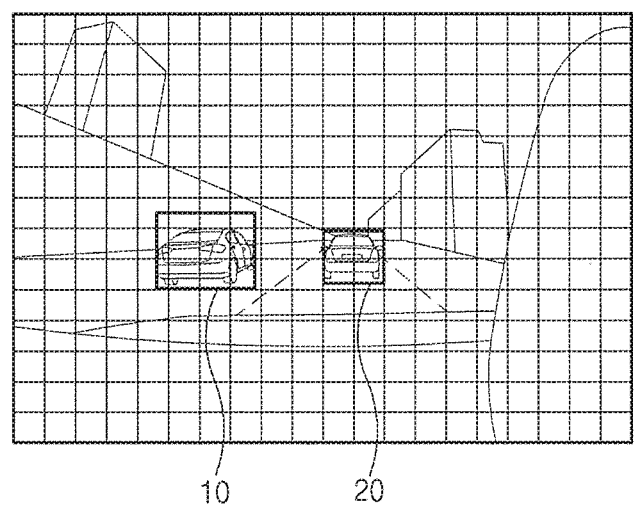
FIG. 4B is a view illustrating an example of the region-of-interest of FIG. 4A after converting the region-of-interest to an image coordinate system.
Figure 5:
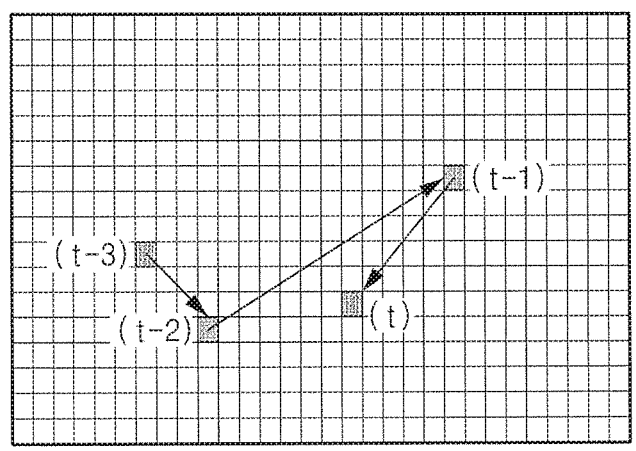
FIG. 5 is a view illustrating a movement of an eye-gaze point in an image coordinate system according to exemplary embodiment of the present disclosure.
Figure 6:
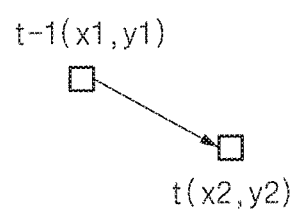
FIG. 6 is a view explaining a method for calculating an eye-gaze movement speed according to exemplary embodiment of the present disclosure.

The image coordinate system processor 230 converts the region-of-interest and the eye-gaze point of the vehicle front image information and the driver facial image information to the image coordinate system. That is, the image coordinate system processor 230 converts the image information in which the regions-of-interest 10 and 20 are defined as shown in FIG. 4A to the image coordinate system as shown in FIG. 4B and defines a plurality of positions of eye-gaze points and the movement of the eye-gaze point on the image coordinate system as shown in FIG. 5.

The driver concentration information calculation processor 240 calculates the concentration information of each of the eye-gaze points. In this case, the concentration information includes the positions of the eye-gaze points and the eye-gaze movement speed between the eye-gaze points. The eye-gaze movement speed may be calculated by the following Equation 1.

$$V(x2,y2)=D\{(x1,y1) \rightarrow (x2,y2)\} * \text{Sampling Rate} \qquad \text{Equation 1}$$

Equation 1 shows an example of calculating the eye-gaze movement speed at an eye-gaze point "t1", and as an example, the eye-gaze movement speed at the eye-gaze point "t1" may be calculated by using position information at an eye-gaze point "t−1", which corresponds to a previous eye-gaze point. In this case, $V(x2,y2)$ denotes the eye-gaze movement speed at a coordinate $(x2,y2)$, $D\{(x1, y1) \rightarrow (x2, y2)$ denotes a distance between a coordinate $(x1, x1)$ and a coordinate $(x2, y2)$, and "Sampling Rate (Srate)" denotes the number of samples per unit time, i.e., 1/time. For instance, the sampling rate is about 15 Hz, i.e., 1/15 s.

The concentration determination processor 250 determines the concentration of the driver based on each concentration information on the image coordinate system. That is, the driver repeats an act of gazing a plurality of objects at the same time so as to recognize a driving environment, and thus the driver remembers specific information. However, since the driving environment is continuously changed while the vehicle runs, the concentration determination processor 250 determines that the driver is in an inattentional blindness state in the case that the driver does not take his or her eyes off of a particular position or the driver's gaze is distracted in the driving vehicle and determines that the concentration of the driver is high in the case that the driver recognizes and continuously checks the traffic-related information needed to respond immediately to a specific event, e.g., an acceleration/deceleration of the front-running vehicle.

For the determination of the concentration, the concentration determination processor 250 calculates an average value of the eye-gaze movement speed, a dispersion value of the positions of the eye-gaze points, and an area value of the eye-gaze points from the concentration information of the eye-gaze points and checks whether each of the average value of the eye-gaze movement speed, the dispersion value of positions the eye-gaze points, and the area value of the eye-gaze points is smaller than a reference value to determine the concentration of the driver.

Figure 7:
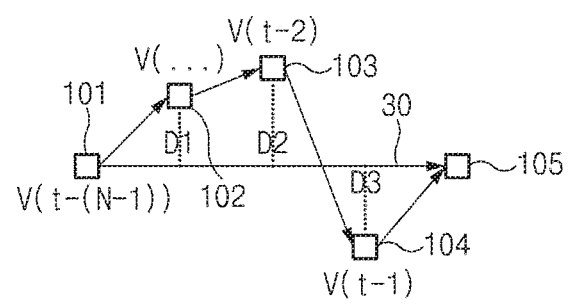
FIG. 7 is a view illustrating N eye-gaze point patterns according to exemplary embodiment of the present disclosure.

The method for calculating the average value of the eye-gaze movement speed, the dispersion value of the positions of the eye-gaze points, and the area value of the eye-gaze points will be described in detail with reference to FIG. 7. The concentration determination processor 250 calculates the average value of the eye-gaze movement speed of the eye-gaze points 101, 102, 103, 104, and 105. In this case, if the average value of the eye-gaze movement speed is smaller than the reference value, i.e., in the case that the eye-gaze movement speed is slow, the concentration determination processor 250 determines that the driver is in the inattentional blindness state.

In addition, the concentration determination processor 250 decides a line connected between a first eye-gaze point 101 and a last eye-gaze point 105 in a monitoring unit pattern among the eye-gaze points 101, 102, 103, 104, and 105 as a reference line 30 and calculates the dispersion value of the positions of the eye-gaze points using distances D1, D2, and D3 between the reference line 30 and each of the eye-gaze points 102, 103, and 104. In this case, the concentration determination processor 250 determines that the concentration of the driver is high when a degree of dispersion of the eye-gaze points is larger than the reference value and that the driver is in the inattentional blindness state when the degree of dispersion of the eye-gaze points is smaller than the reference value.

In addition, the concentration determination processor 250 calculates an area of a shape, which is defined by connecting the eye-gaze points 101, 102, 103, 104, and 105 to each other using a line, as the area value of the eye-gaze points. In this case, the area value of the eye-gaze points is used to determine whether a range of eye-gaze of the driver is wide enough. In a case that the range of the eye-gaze is smaller than a reference value, the concentration determination processor 250 determines whether the driver is acquiring the traffic-related information from the region-of-interest or the driver is just looking blankly at the region-of-interest so as to decide whether the driver is in the inattentional blindness state.

Figure 4C:
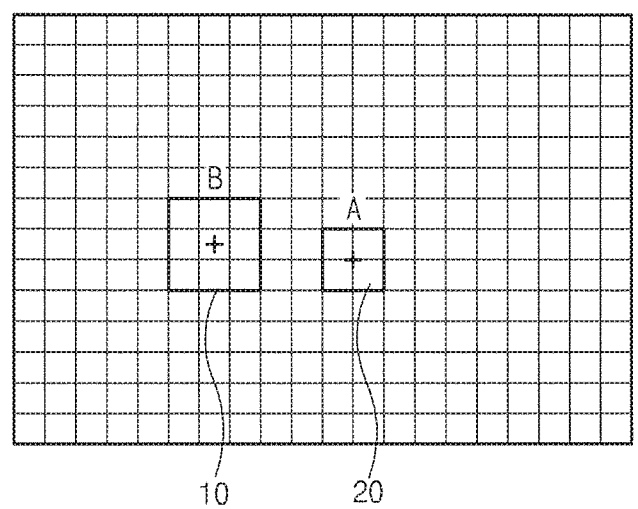
FIG. 4C is a view illustrating an example of the region-of-interest of FIG. 4B, which is defined in the image coordinate system.

Then, the concentration determination processor 250 calculates a relative distance between the regions-of-interest 10 and 20 defined as shown in FIG. 4C and the eye-gaze points 101, 102, 103, 104, and 105 to determine a correlation degree between each of the regions-of-interest 10 and 20 and the eye-gaze points 101, 102, 103, 104, and 105. In this case, the relative distance between the regions-of-interest 10 and 20 and the eye-gaze points 101, 102, 103, 104, and 105 may be calculated by the following Equation 2.

$$\text{relative distance}_A \text{ average} = \Sigma \text{Dist(unit eye-gaze point}_t\text{-region-of-interest}_{Ai})/(N*i)$$

$$\text{relative distance}_B \text{ average} = \Sigma \text{Dist(unit eye-gaze point}_t\text{-region-of-interest}_{Bi})/(N*j) \qquad \text{Equation 2}$$

In Equation 2, the "relative distance$_A$ average" denotes an average value of the relative distance between the eye-gaze points 101, 102, 103, 104, and 105 and the region-of-interest (A;20), and the "relative distances average" denotes an average value of the relative distance between the eye-gaze points 101, 102, 103, 104, and 105 and the region-of-interest (B;20). "Dist(unit eye-gaze point$_t$-region-of-interest$_{Ai}$)" denotes a distance between the eye-gaze point (t) and a pixel "i" of the region-of-interest (A;20), "N" denotes the number of eye-gaze points, and "i" denotes the number of pixels of the region-of-interest (A;20).

Figure 8:
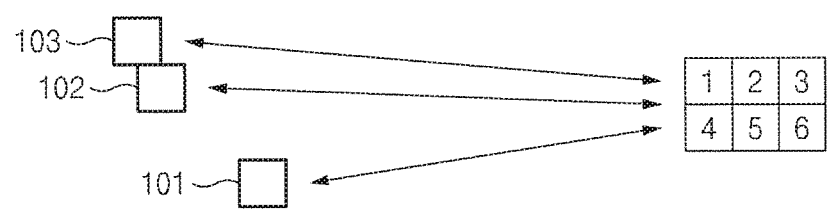
FIG. 8 is a view explaining a method of calculating a relative distance between the region-of-interest shown in FIG. 4C and N eye-gaze points.
Figure 9:
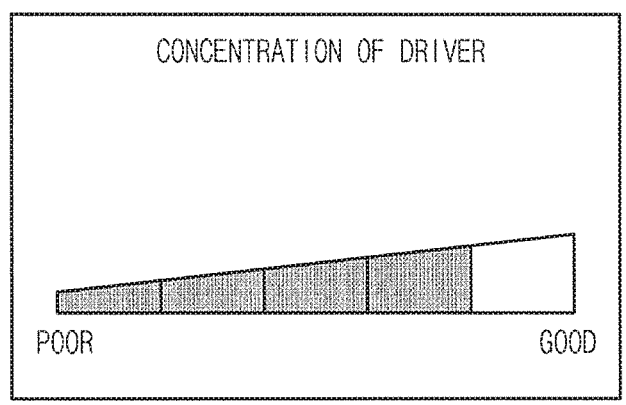
FIG. 9 is a view illustrating a status of a warning light indicating a concentration of a driver according to exemplary embodiment of the present disclosure.

Referring to FIG. 8, relative distances between each of the eye-gaze points 101, 102, and 103 and six pixels in the region-of-interest (A;20) are calculated. For instance, in a case that the number of the eye-gaze points is three and the number of the pixels of the region-of-interest is six, eighteen (18) relative distances may be calculated. As described above, since the relative distance is calculated with respect to each region-of-interest, the correlation degrees between the region-of-interest and the eye-gaze points are calculated. The concentration determination processor 250 may differentially determine the concentration of the driver with respect to each region-of-interest based on the correlation degree between the eye-gaze points. In addition, the concentration determination processor 250 may differentially determine the concentration of the driver with respect to each region-of-interest after quantifying the concentration of the driver.

In addition, the concentration determination processor 250 may calculate the correlation degree between the region-of-interest and the eye-gaze points in a case that the average value of the eye-gaze movement speed is smaller than a first reference value and the dispersion value of the positions of the eye-gaze points is smaller than a second reference value.

In addition, the concentration determination processor 250 may calculate the correlation degree between the region-of-interest and the eye-gaze points in a case that the average value of the eye-gaze movement speed is smaller than the first reference value and the area value of the eye-gaze points is smaller than a third reference value.

The driver attention-guide control processor 260 provides at least one of a warning alarm, a guidance, and an attention-guide to the driver in the case that the concentration of the driver is smaller than the reference value. That is, the driver attention-guide control processor 260 provides various feedbacks, e.g., an alert message output, a sound alert, a vibration alert, etc., to the driver in conjunction with the output 300 to induce the eye-gaze of the driver to the regions-of-interest.

In addition, in a case that the vehicle is running through a control support device, e.g., a lane maintenance system, a driver assistant system, an autonomous vehicle driving system, etc., the driver attention-guide control processor 260 may control a ratio and a transfer time point of a driving control right, which enables the driver to control the vehicle, in the case that it is determined that the concentration of the driver is smaller than the reference value. That is, in the case that the concentration of the driver is low, the system of the vehicle may control the vehicle to continuously maintain the autonomous vehicle driving state without transferring the driving control right or may minimize the transfer ratio of the driving control right to the driver.

Figure 10:
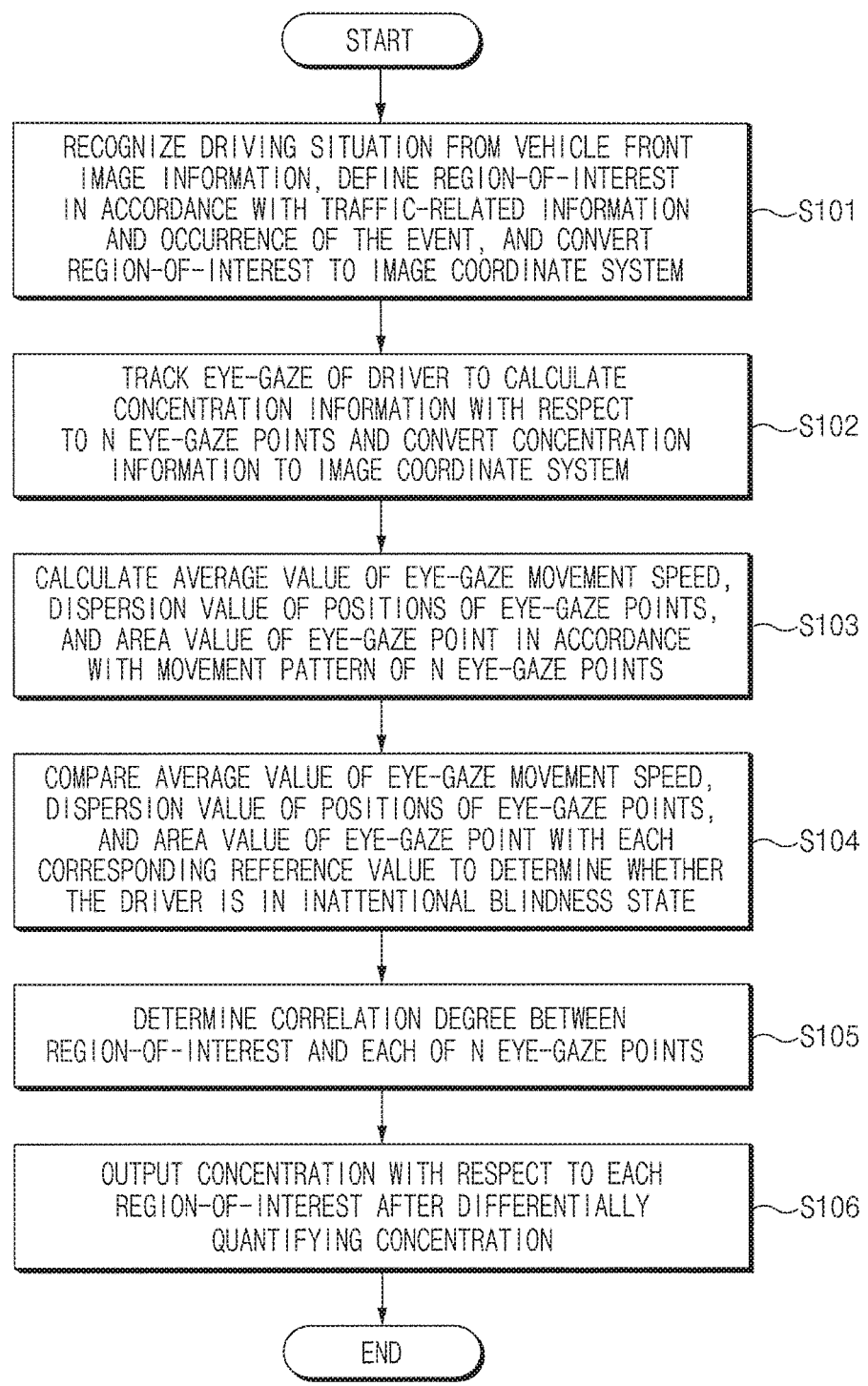
FIG. 10 is a flowchart illustrating a method for determining a concentration of a driver according to exemplary embodiment of the present disclosure.

Hereinafter, a method for determining the concentration of the driver according to an exemplary embodiment of the present disclosure will be described with reference to FIG. 10.

First, the driver concentration determination apparatus 200 recognizes the driving situation from the vehicle front image information acquired by the image acquisition device 110, defines the region-of-interest in accordance with the traffic-related information and the occurrence of the event, e.g., an acceleration/deceleration of the front-running vehicle, a change of the driving lane, etc., and converts the region-of-interest to the image coordinate system (S101).

The driver concentration determination apparatus 200 tracks the eye-gaze of the driver to calculate N concentration information and defines the N positions of the eye-gaze points and the movement of the eye-gaze points on the image coordinate system (S102).

The driver concentration determination apparatus 200 calculates the average value of the eye-gaze movement speed, the dispersion value of the positions of the eye-gaze points, and the area value of the eye-gaze points in accordance with the movement pattern of the N eye-gaze points (S103). In this case, the driver concentration determination apparatus 200 decides the line connected between the first eye-gaze point and the last eye-gaze point in the monitoring unit pattern among the eye-gaze points as the reference line and calculates the dispersion value of the eye-gaze points using the distances between the reference line and the eye-gaze points. In addition, the driver concentration determination apparatus 200 calculates the area of the shape, which is defined by connecting the eye-gaze points to each other using a line, as the area value of the eye-gaze points.

The driver concentration determination apparatus 200 compares the average value of the eye-gaze movement speed, the dispersion value of the positions of the eye-gaze points, and the area value of the eye-gaze points with each corresponding reference value to determine whether the driver is in the state in which the concentration of the driver decreases (e.g., the inattentional blindness state) (S104).

The driver concentration determination apparatus 200 calculates the relative distances between the region-of-interest and each of the N eye-gaze points to determine the correlation degree (S105). That is, based on the relative distances between the regions-of-interest and the N eye-gaze points, the driver concentration determination apparatus 200 may determine that the concentration of the driver with respect to the region-of-interest that is relatively close to the N eye-gaze points, i.e., the relative distance is short, is high and the concentration of the driver with respect to the region-of-interest that is relatively far from the eye-gaze point, i.e., the relative distance is long, is low.

The driver concentration determination apparatus 200 outputs the concentration with respect to each region-of-interest after differentially quantifying the concentration in accordance with a distance reference (S106).

Figure 11:
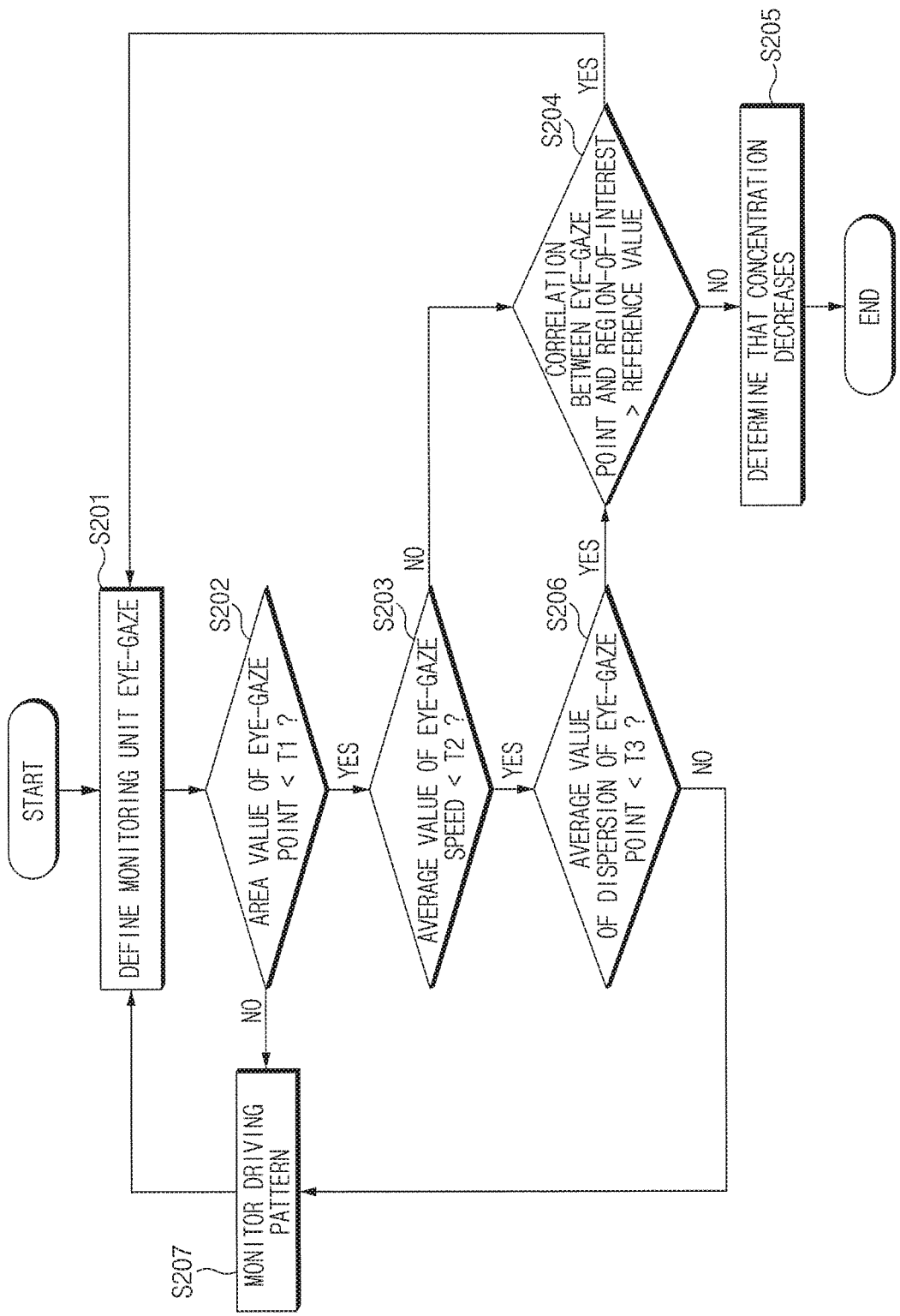
FIG. 11 is a flowchart illustrating a method for determining a decrease in concentration of a driver of FIG. 10.

Hereinafter, a method for determining the decrease in concentration of the driver of FIG. 10 will be described in detail with reference to FIG. 11.

First, the concentration determination processor 250 defines the monitoring unit eye-gaze among the eye-gaze points (S201) and determines whether the area value of the eye-gaze points is smaller than the reference value T1 (S202).

In the case where the area value of the eye-gaze points is smaller than the reference value T1, the concentration determination processor 250 determines whether the average value of the eye-gaze movement speed is smaller than a reference value T2 to continuously check the concentration (S203). In the case where the average value of the eye-gaze movement speed is smaller than the reference value T2, the concentration determination processor 250 determines the correlation degree between the eye-gaze point and the region-of-interest (S204). In the case where the correlation degree between the eye-gaze point and the region-of-interest is smaller than a reference value, the concentration determination processor 250 determines that the concentration of the driver decreases (S205).

Meanwhile, in the case where the area value of the eye-gaze points is equal to or greater than the reference value T1 in operation S203, the concentration determination processor 250 determines whether the average value of the dispersion of the eye-gaze points is smaller than a reference value T3 (S206). In the case where the average value of the dispersion of the eye-gaze points is smaller than the reference value T3, the concentration determination processor 250 determines the correlation degree between the eye-gaze point and the region-of-interest (S204). In the case where the correlation degree between the eye-gaze point and the region-of-interest is smaller than the reference value, the concentration determination processor 250 determines that the concentration of the driver decreases (S205).

Meanwhile, in the case where the area value of the eye-gaze points is equal to or greater than the reference value T1 in operation S202 or the average value of the dispersion of the eye-gaze points is equal to or greater than the reference value T3 in operation S206, the concentration of the driver is determined by monitoring the driving pattern of the driver (S207).

In the present exemplary embodiment, the concentration determination processor 250 may determine that the concentration of the driver is high or the driver gazes a point other than the region-of-interest (valid area) in the case that the area value of the eye-gaze points is smaller than the first reference value T1, the average value of the eye-gaze movement speed is smaller than the second reference value T2, or the dispersion value of the positions of the eye-gaze points is smaller than the third reference value T3.

As described above, the apparatus and method according to the present disclosure determines the concentration of the driver based on the position of the eye-gaze point of the driver and the eye-gaze movement speed of the driver and provides the concentration with respect to each region-of-interest to the driver after quantifying the concentration with respect to each region-of-interest, thereby leading the driver to drive safely.

Figure 12:
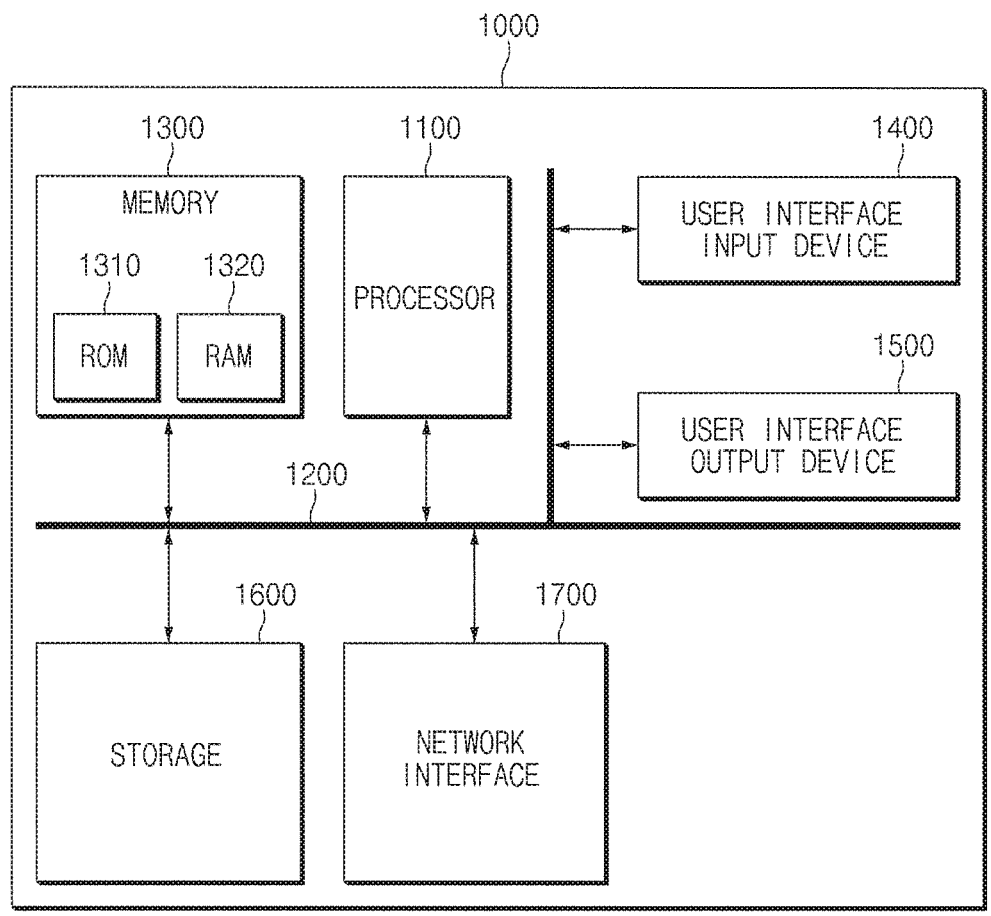
FIG. 12 is a block diagram illustrating a configuration of a computing system to which a technique for determining a concentration of a driver is applied according to an exemplary embodiment of the present disclosure.

FIG. 12 is a block diagram illustrating a configuration of a computing system 1000 to which a technique for determining the concentration of the driver is applied, according to an exemplary embodiment of the present disclosure.

Referring to FIG. 12, the computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal.

The various embodiments disclosed herein, including embodiments of the driver concentration determination apparatus 200 and/or elements thereof, can be implemented using one or more processors coupled to a memory (or other non-transitory machine readable recording medium) storing computer-executable instructions for causing the processor(s) to perform the functions described above including the functions described in relation to the region-of-interest definition processor 210, the driver eye-gaze detection processor 220, the image coordinate system processor 230, the driver concentration information calculation processor 240, the concentration determination processor 250, and the driver attention-guide control processor 260.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. An apparatus for determining a concentration of a driver, the apparatus comprising:
  a region-of-interest definition processor configured to define a region-of-interest based on traffic-related information on front image information of a vehicle running;
  a driver eye-gaze detection processor configured to detect a plurality of eye-gaze points from driver image information of a driver in accordance with an eye-gaze movement of the driver;
  a driver concentration information calculation processor configured to calculate concentration information of each of the plurality of eye-gaze points;
  an image coordinate system processor configured to convert the region-of-interest to an image coordinate system and convert positions of the plurality of eye-gaze points to the image coordinate system; and
  a concentration determination processor configured to:
    determine the concentration of the driver on the image coordinate system based on the concentration information,
    calculate at least one or more of an average value of an eye-gaze movement speed, a dispersion value of the positions of the plurality of eye-gaze points, or an area value of the plurality of eye-gaze points from the concentration information of each of the plurality of eye-gaze points, and
    decide a line connected between a first eye-gaze point and a last eye-gaze point in a monitoring unit pattern among the plurality of eye-gaze points as a reference line and calculate the dispersion value of the positions of the plurality of eye-gaze points using distances between the reference line and the plurality of eye-gaze points.

2. The apparatus of claim 1, further comprising a driver attention-guide control processor configured to provide at least one of a warning alarm, a guidance, and an attention-guide to the driver when the concentration of the driver is smaller than a reference concentration value.

3. The apparatus of claim 2, wherein the driver attention-guide control processor is configured to control a transfer ratio and a transfer time point of a driving control right, which enables the driver to control the vehicle, when the concentration of the driver is smaller than the reference concentration value and the vehicle is driven by a control support device.

4. The apparatus of claim 1, wherein the region-of-interest definition processor is configured to define the region-of-interest by adjusting a priority of information that the driver needs to check in accordance with a driving situation occurring in real time while driving.

5. The apparatus of claim 4, wherein the driving situation occurring in real time while driving comprises at least one of a variation in speed of a front-running vehicle in a driving lane, an interruption of a vehicle running in adjacent lane, a variation of safety distance in a direction of the vehicle, and a change of the driving lane.

6. The apparatus of claim 1, wherein the driver concentration information calculation processor is configured to calculate the positions of the plurality of eye-gaze points and the eye-gaze movement speed between the plurality of eye-gaze points as the concentration information.

7. The apparatus of claim 1, wherein the concentration determination processor is configured to calculate an area of a shape, which is defined by connecting the plurality of eye-gaze points to each other using a line, as the area value of the plurality of eye-gaze points.

8. The apparatus of claim 1, wherein the concentration determination processor is configured to calculate a relative distance between the region-of-interest and the plurality of eye-gaze points and determine a correlation degree between the region-of-interest and the plurality of eye-gaze points.

9. The apparatus of claim 8, wherein the concentration determination processor is configured to differentially quantify the concentration of the driver in accordance with the correlation degree between the region-of-interest and the plurality of eye-gaze points.

10. The apparatus of claim 1, wherein the concentration determination processor is configured to determine that the concentration of the driver is high or the driver gazes a point other than the region-of-interest when the area value of the plurality of eye-gaze points is smaller than a first reference value, the average value of the eye-gaze movement speed is smaller than a second reference value, or the dispersion value of the positions of the plurality of eye-gaze points is smaller than a third reference value.

11. A system for determining a concentration of a driver, the system comprising:
    an image acquisition device configured to acquire a vehicle front image and a driver facial image;
    a driver concentration determination processor configured to detect an eye-gaze movement of the driver from the driver facial image, calculate concentration information with respect to a plurality of eye-gaze points of the driver, and determine the concentration of the driver based on the concentration information; and
    an output device configured to output a concentration guide warning alarm to the driver when the concentration of the driver is determined to be smaller than a reference value by the driver concentration determination processor,
    wherein the driver concentration determination processor is further configured to calculate at least one or more of an average value of an eye-gaze movement speed, a dispersion value of positions of the plurality of eye-gaze points, or an area value of the plurality of eye-gaze points from the concentration information of the plurality of eye-gaze points, and
    wherein the driver concentration determination processor is further configured to decide a line connected between a first eye-gaze point and a last eye-gaze point in a monitoring unit pattern among the plurality of eye-gaze points as a reference line and calculate the dispersion value of the positions of the plurality of eye-gaze points using distances between the reference line and the plurality of eye-gaze points.

12. The system of claim 11, wherein the output comprises:
    a display configured to display at least one of a warning message, a warning light, and a warning screen of an augmented reality screen;
    a speaker configured to output a warning sound; and
    a vibrator configured to provide the driver with a vibration stimulus.

13. The system of claim 11, wherein the driver concentration determination processor comprises:
    a region-of-interest definition processor configured to define a region-of-interest based on traffic-related information on front image information of a vehicle running;
    a driver eye-gaze detection processor configured to detect the plurality of eye-gaze points from driver image information of a driver in accordance with an eye-gaze movement of the driver;
    a driver concentration information calculation processor configured to calculate the concentration information of the plurality of eye-gaze points;
    an image coordinate system processor configured to convert the region-of-interest to an image coordinate system and convert the positions of the plurality of eye-gaze points to the image coordinate system; and
    a concentration determination processor configured to determine the concentration of the driver on the image coordinate system based on the concentration information.

14. The system of claim 13, wherein the driver concentration information calculation processor is configured to calculate positions of the plurality of eye-gaze points and the eye-gaze movement speed between the plurality of eye-gaze points as the concentration information.

15. A method for determining a concentration of a driver, the method comprising steps of:
    defining a region-of-interest based on traffic-related information on front image information of a vehicle running;
    detecting a plurality of eye-gaze points from driver image information of a driver in accordance with an eye-gaze movement of the driver;
    calculating concentration information of each of the plurality of eye-gaze points;
    converting the region-of-interest to an image coordinate system and converting positions of the plurality of eye-gaze points to the image coordinate system; and
    determining the concentration of the driver on the image coordinate system based on the concentration information,
    wherein the step of determining includes:
    calculating at least one or more of an average value of an eye-gaze movement speed, a dispersion value of the positions of the plurality of eye-gaze points, or an area value of the plurality of eye-gaze points from the concentration information of the plurality of eye-gaze points; and
    deciding a line connected between a first eye-gaze point and a last eye-gaze point in a monitoring unit pattern among the plurality of eye-gaze points as a reference line and calculating the dispersion value of the positions of the plurality of eye-gaze points using distances between the reference line and the plurality of eye-gaze points.

16. The method of claim 15, wherein the step of calculating includes calculating the positions of the plurality of eye-gaze points and the eye-gaze movement speed between the plurality of eye-gaze points as the concentration information.

17. The method of claim 15, wherein the step of determining further includes comparing each of the average value of the eye-gaze movement speed, the dispersion value of the positions of the plurality of eye-gaze points, and the area value of the plurality of eye-gaze points with a corresponding reference value to determine the concentration of the driver.

* * * * *